(12) United States Patent
Lundvall et al.

(10) Patent No.: US 7,725,736 B2
(45) Date of Patent: *May 25, 2010

(54) MESSAGE DIGEST INSTRUCTION

(75) Inventors: Shawn D. Lundvall, Poughkeepsie, NY (US); Ronald M. Smith, Sr., Wappingers Falls, NY (US); Phil Chi-Chung Yeh, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 637 days.

This patent is subject to a terminal disclaimer.

(21) Appl. No.: 11/551,292

(22) Filed: Oct. 20, 2006

(65) Prior Publication Data

US 2007/0055886 A1    Mar. 8, 2007

Related U.S. Application Data

(62) Division of application No. 10/436,230, filed on May 12, 2003, now Pat. No. 7,159,122.

(51) Int. Cl.
  *H04L 9/00*    (2006.01)
(52) U.S. Cl. ........................................ 713/189; 380/28
(58) Field of Classification Search ................. 713/189; 380/28
  See application file for complete search history.

(56) References Cited

U.S. PATENT DOCUMENTS

| | | | |
|---|---|---|---|
| 4,578,530 A | 3/1986 | Zeidler ..................... 178/22.09 |
| 5,200,999 A | 4/1993 | Matyas et al. ................. 380/25 |
| 5,551,013 A | 8/1996 | Beausoleil et al. |
| 5,574,873 A | 11/1996 | Davidian |
| 5,666,411 A | 9/1997 | McCarty ........................ 380/4 |
| 5,765,030 A | 6/1998 | Nachenberg et al. .......... 714/33 |
| 5,790,825 A | 8/1998 | Traut |
| 6,009,261 A | 12/1999 | Scalzi et al. |
| 6,134,592 A | 10/2000 | Montulli ..................... 709/229 |
| 6,308,255 B1 | 10/2001 | Gorishek, IV et al. |
| 6,463,582 B1 | 10/2002 | Lethin et al. |
| 6,496,932 B1 | 12/2002 | Trieger ........................ 713/168 |
| 6,542,981 B1 | 4/2003 | Zaidi et al. ..................... 712/2 |
| 6,996,725 B2 | 2/2006 | Ma et al. ....................... 726/22 |

(Continued)

FOREIGN PATENT DOCUMENTS

EP    0354774 A2    8/1989

(Continued)

OTHER PUBLICATIONS

One Way Hash Functions, Bruce Schneier, Dr. Dobb's Journal vol. 16, No. 9, 1991, pp. 148-151.

(Continued)

*Primary Examiner*—Jung Kim
*Assistant Examiner*—Izunna Okeke
(74) *Attorney, Agent, or Firm*—John E. Campbell

(57) ABSTRACT

A method, system and computer program product for digesting data in storage of a computing environment. The digesting computes a condensed representation of a message or data stored in the computer storage. A COMPUTE INTERMEDIATE MESSAGE DIGEST (KIMD) and a COMPUTE LAST MESSAGE DIGEST (KLMD) instruction are disclosed which specify a unit of storage to be digested by a secure hashing algorithm.

20 Claims, 9 Drawing Sheets

| CODE | FUNCTION | PARM. BLOCK SIZE (BYTES) | DATA BLOCK SIZE (BYTES) |
|---|---|---|---|
| 0 | KIMD-QUERY | 16 | — |
| 1 | KIMD-SHA-1 | 20 | 64 |

EXPLANATION:
— NOT APPLICABLE

U.S. PATENT DOCUMENTS

| | | | | |
|---|---|---|---|---|
| 2002/0184046 | A1 | 12/2002 | Kamada et al. | 705/1 |
| 2002/0191790 | A1 | 12/2002 | Anand | 380/255 |
| 2002/0191792 | A1 | 12/2002 | Anand | 380/42 |
| 2003/0002666 | A1 | 1/2003 | Takahashi | 380/42 |
| 2003/0028765 | A1 | 2/2003 | Cromer et al. | 713/164 |

FOREIGN PATENT DOCUMENTS

| | | |
|---|---|---|
| EP | 0725511 A2 | 1/1996 |
| GB | 1494750 | 12/1977 |
| JP | PUPA 5093054 | 7/1975 |
| JP | PUPA 56-121138 | 9/1981 |
| JP | PUPA 11-249873 | 9/1999 |
| JP | PUPA 2001-142694 | 5/2001 |
| WO | WO 01/11818 A2 | 8/1999 |

OTHER PUBLICATIONS

IBM PCI Cryptographic Coprocessor CCA Basic Services Reference and Guide for IBM 4758 Models 002 and 023 with Release 2.40, Sep. 2001, http://www.zone-h.org/Files/33/CCA_Basic_Services_240.pdf; pp. 1-1 through 2-18; 6-1 through 6-16; 7-1 through 7-24; B-1 gthrough B42; F-1 through F-4.

"CryptoManiac A Fast Flexible Architecture for Secure Communication", L. Wu et al., 28th Annual International Symposium on Computer Architecture, Jun. 2001, pp. 1-10.

The Microacrchitecture of the IBM eServer z900 Processor, E. M. Schwarz et al., IBM Journal of Research and Development, vol. 46, No. 4/5, Jul./Sep. 2002, pp. 381-395.

Unpublished IBM document describing prior art, pp. 1-15.

European Patent Office PCT, Applicant's file reference POU030108, date of mailing Nov. 24, 2005, International Application No. PCT/GB2004/001915, International Filing Date Apr. 5, 2004, 14 pages.

The Patent Office, Patents Directorate, Reference POU920030108GB1, Application No. GB0518811.5, Examination Report, Date 14 Dec. 2005, 3 pages.

z/Architecture Principles of Operation, SA22-7832-00, First Edition, Dec. 2000, 1026 pages.

KIMD R₁,R₂ [RRE]
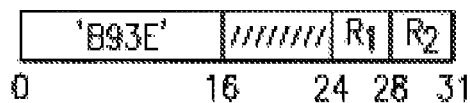
FIG.1
KLMD R₁,R₂ [RRE]
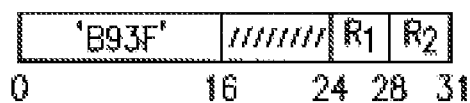
FIG.2
| CODE | FUNCTION | PARM. BLOCK SIZE (BYTES) | DATA BLOCK SIZE (BYTES) |
|---|---|---|---|
| 0 | KIMD-QUERY | 16 | — |
| 1 | KIMD-SHA-1 | 20 | 64 |
| EXPLANATION: — NOT APPLICABLE ||||
FIG.3
| CODE | FUNCTION | PARM. BLOCK SIZE (BYTES) | DATA BLOCK SIZE (BYTES) |
|---|---|---|---|
| 0 | KLMD-QUERY | 16 | — |
| 1 | KLMD-SHA-1 | 28 | 64 |
| EXPLANATION: — NOT APPLICABLE ||||
FIG.4

24-BIT ADDRESSING MODE 31-BIT ADDRESSING MODE

GR0: /// //////////////// 0 FC (0, 32, 56, 63) | /// //////////////// 0 FC (0, 32, 56, 63)

GR1: /// //////// PARAMETER-BLOCK ADDRESS (0, 32, 40, 63) | /// / PARAMETER-BLOCK ADDRESS (0, 33, 63)

R2: /// //////// SECOND-OPERAND ADDRESS (0, 32, 40, 63) | /// / SECOND-OPERAND ADDRESS (0, 33, 63)

R2+1: /// SECOND-OPERAND LENGTH (0, 32, 63) | /// SECOND-OPERAND LENGTH (0, 32, 63)

64-BIT ADDRESSING MODE

GR0: /// //////////////////// 0 FC (0, 32, 56, 63)

GR1: PARAMETER-BLOCK ADDRESS (0, 63)

R2: SECOND-OPERAND ADDRESS (0, 63)

R2+1: SECOND-OPERAND LENGTH (0, 63)

FIG.5

1.–6. EXCEPTIONS WITH THE SAME PRIORITY AS THE PRIORITY OF PROGRAM-INTERRUPTION CONDITIONS FOR THE GENERAL CASE.

7.A ACCESS EXCEPTIONS FOR SECOND INSTRUCTION HALFWORD.

7.B OPERATION EXCEPTION.

8. SPECIFICATION EXCEPTION DUE TO INVALID FUNCTION CODE OR INVALID REGISTER NUMBER.

9. SPECIFICATION EXCEPTION DUE TO INVALID OPERAND LENGTH.

10. CONDITION CODE 0 DUE TO SECOND-OPERAND LENGTH ORIGINALLY ZERO.

11. ACCESS EXCEPTIONS FOR AN ACCESS TO THE PARAMETER BLOCK OR SECOND OPERAND.

12. CONDITION CODE 0 DUE TO NORMAL COMPLETION (SECOND-OPERAND LENGTH ORIGINALLY NONZERO, BUT STEPPED TO ZERO).

13. CONDITION CODE 3 DUE TO PARTIAL COMPLETION (SECOND-OPERAND LENGTH STILL NONZERO).

FIG.16

MESSAGE DIGEST INSTRUCTION

CROSS-REFERENCE TO RELATED APPLICATION

This is a divisional application of Ser. No. 10/436,230 "MESSAGE DIGEST INSTRUCTIONS" filed on May 12, 2003 now U.S. Pat. No. 7,159,122 and assigned to IBM. The disclosure of the forgoing application is incorporated herein by reference.

BACKGROUND OF THE INVENTION

This invention relates to computer system architecture and particularly to new instructions which augment the IBM z/Architecture and can be emulated by other architectures.

Before our invention IBM has created through the work of many highly talented engineers beginning with machines known as the IBM System 360 in the 1960s to the present, a special architecture which, because of its essential nature to a computing system, became known as "the mainframe" whose principles of operation state the architecture of the machine by describing the machine instructions which may be executed upon the "mainframe" implementation of the machine instructions which had been invented by IBM inventors and adopted, because of their significant contribution to improving the state of the computing machine represented by "the mainframe", as significant contributions by inclusion in IBM's Principles of Operation as stated over the years. The First Edition of the z/Architecture Principles of Operation which was published December, 2000 has become the standard published reference as SA22-7832-00. We determined that further new instructions would assist the art and could be included in a z/Architecture machine and also emulated by others in simpler machines, as described herein.

We determined that further new instructions would assist the art and could be included in a z/Architecture machine and also emulated by others in simpler machines, as described herein.

BRIEF SUMMARY OF THE INVENTION

It is a primary object of the present invention to disclose CPU-synchronous, problem-state, and sectioning instructions which digest data in computer storage wherein the instructions compute a condensed representation of messages or data.

It is another object of the invention to disclose instructions which specify a unit of storage to be digested, and wherein a secure hashing algorithm digests the data in the specified unit of storage.

It is another object of the invention to disclose a COMPUTE INTERMEDIATE MESSAGE DIGEST instruction and a COMPUTE LAST MESSAGE DIGEST instruction.

It is a further object of the invention to disclose a digest instruction wherein complete blocks of data are processed, and after processing all complete blocks, a padding operation is performed to include the remaining portion of the specified storage.

It is another object of the invention to emulate the digest instruction in a computer architecture which is different than the computer architecture of the instruction.

BRIEF DESCRIPTION OF THE SEVERAL VIEWS OF THE DRAWING

These and other objects will be apparent to one skilled in the art from the following detailed description of the invention taken in conjunction with the accompanying drawings in which:

FIG. 1 is representation of the Compute Intermediate Message Digest (KIMD) instruction in the RRE instruction format;

FIG. 2 is a representation of the Compute Last Message Digest (KLMD) instruction in the RRE instruction format;

FIG. 3 is a table showing the function codes of the KIMD instruction of FIG. 1;

FIG. 4 is a table showing the function codes of the KLMD Instruction of FIG. 2;

FIG. 5 representation of the general register assignment for the KIMD and KLMD instructions of FIGS. 1 and 2;

FIG. 16 is a table showing the priority of execution of the KIMD and KLMD instructions;

DETAILED DESCRIPTION OF THE INVENTION

Figure 6:
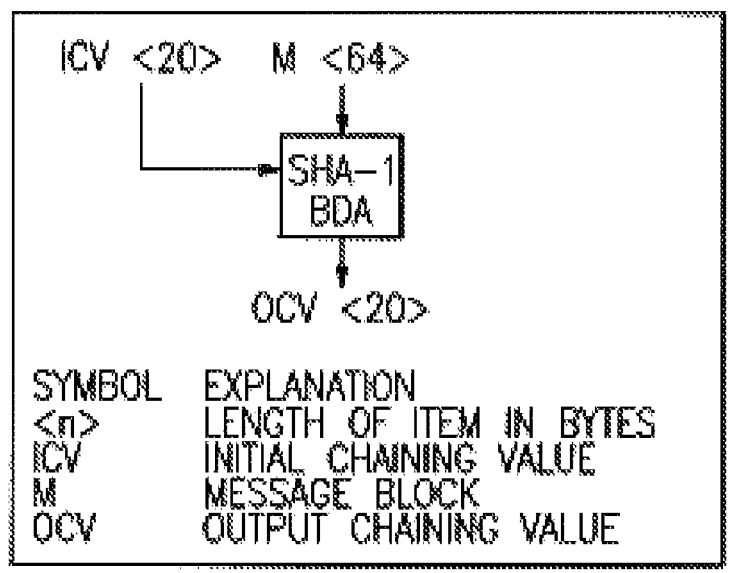
FIG. 6 illustrates the symbol for SHA-1 Block Digest, Algorithm.

The message digest instructions discussed herein are for computing a condensed representation of a message or data file. The compute intermediate message digest and the compute last message digest instructions will first be discussed, followed by a discussion of the preferred computer system for executing these instructions. In the alternative, a second preferred computer system which emulates another computer system for executing these instructions will be discussed.

Compute Intermediate Message Digest (KIMD)

FIG. 1 is representation of the Compute Intermediate Message Digest (KIMD) instruction in the RRE instruction format.

Compute Last Message Digest (KLMD)

FIG. 2 is a representation of the Compute Last Message Digest (KLMD) instruction in the RRE instruction format;

A function specified by the function code in general register 0 is performed.

Bits 16-23 of the instruction and the R1 field are ignored.

Bit positions 57-63 of general register 0 contain the function code. FIGS. 3 and 4 show the assigned function codes for COMPUTE INTERMEDIATE MESSAGE DIGEST AND COMPUTE LAST MESSAGE DIGEST, respectively. All other function codes are unassigned. Bit 56 of general register 0 must be zero; otherwise, a specification exception is recognized. All other bits of general register 0 are ignored. General register 1 contains the logical address of the leftmost byte of the parameter block in storage. In the 24-bit addressing mode, the contents of bit positions 40-63 of general register 1 constitute the address, and the contents of bit positions 0-39 are ignored. In the 31-bit addressing mode, the contents of bit positions 33-63 of general register 1 constitute the address, and the contents of bit positions 0-32 are ignored. In the 64-bit addressing mode, the contents of bit positions 0-63 of general register 1 constitute the address.

The function codes for COMPUTE INTERMEDIATE MESSAGE DIGEST are shown in FIG. 3.

The function codes for COMPUTE LAST MESSAGE DIGEST ARE shown in FIG. 4.

All other function codes are unassigned.

The query function provides the means of indicating the availability of the other functions. The contents of general registers R2 and R2+1 are ignored for the query function.

For all other functions, the second operand is processed as specified by the function code using an initial chaining value in the parameter block, and the result replaces the chaining value. For COMPUTE LAST MESSAGE DIGEST, the operation also uses a message bit length in the parameter block. The operation proceeds until the end of the second-operand location is reached or a CPU-determined number of bytes have been processed, whichever occurs first. The result is indicated in the condition code.

The R2 field designates an even-odd pair of general registers and must designate an even numbered register; otherwise, a specification exception is recognized.

The location of the leftmost byte of the second operand is specified in the contents of the R2 general register. The number of bytes in the second-operand location is specified in general register R2+1.

As part of the operation, the address in general register R2 is incremented by the number of bytes processed from the second operand, and the length in general register R2+1 is decremented by the same number. The formation and updating of the address and length is dependent on the addressing mode.

In the 24-bit addressing mode, the contents of bit positions 40-63 of general register R2 constitute the address of second operand, and the contents of bit positions 0-39 are ignored; bits 40-63 of the updates address replace the corresponding bits in general register R2, carries out of bit position 40 of the updated address are ignored, and the contents of bit positions 32-39 of general register R2 are set to zeros. In the 31-bit addressing mode, the contents of bit positions 33-63 of general register R2 constitute the address of second operand, and the contents of bit positions 0-32 are ignored; bits 33-63 of the updated address replace the corresponding bits in general register R2, carries out of bit position 33 of the updated address are ignored, and the content of bit position 32 of general register R2 is set to zero. In the 64-bit addressing mode, the contents of bit positions 0-63 of general register R2 constitute the address of second operand; bits 0-63 of the updated address replace the contents of general register R2 and carries out of bit position 0 are ignored.

In both the 24-bit and the 31-bit addressing modes, the contents of bit positions 32-63 of general register R2+1 form a 32-bit unsigned binary integer which specifies the number of bytes in the second operand; and the updated value replaces the contents of bit positions 32-63 of general register R2+1. In the 64-bit addressing mode, the contents of bit positions 0-63 of general register R2+1 form a 64-bit unsigned binary integer which specifies the number of bytes in the second operand; and the updated value replaces the contents of general register R2+1.

In the 24-bit or 31-bit addressing mode, the contents of bit positions 0-31 of general registers R2 and R2+1, always remain unchanged.

FIG. 5 shows the contents of the general registers just described.

In the access-register mode, access registers 1 and R2 specify the address spaces containing the parameter block and second operand, respectively.

The result is obtained as if processing starts at the left end of the second operand and proceeds to the right, block by block. The operation is ended when all source bytes in the second operand have been processed (called normal completion), or when a CPU-determined number of blocks that is less than the length of the second operand have been processed (called partial completion). The CPU-determined number of blocks depends on the model, and may be a different number each time the instruction is executed. The CPU-determined number of blocks is usually nonzero. In certain unusual situations, this number may be zero, and condition code 3 may be set with no progress. However, the CPU protects against endless reoccurrence of this no-progress case.

When the chaining-value field overlaps any portion of the second operand, the result in the chaining value field is unpredictable.

For COMPUTE INTERMEDIATE MESSAGE DIGEST, normal completion occurs when the number of bytes in the second operand as specified in general register R2+1 have been processed. For COMPUTE LAST MESSAGE DIGEST, after all bytes in the second operand as specified in general register R2+1 have been processed, the padding operation is performed, and then normal completion occurs.

When the operation ends due to normal completion, condition code 0 is set and the resulting value in R2+1 is zero. When the operation ends due to partial completion, condition code 3 is set and the resulting value in R2+1 is nonzero.

When the second-operand length is initially zero, the second operand is not accessed, general registers R2 and R2+1 are not changed, and condition code 0 is set. For COMPUTE INTERMEDIATE MESSAGE DIGEST, the parameter block is not accessed. However, for COMPUTE LAST MESSAGE DIGEST, the empty block (L=0) case padding operation is performed and the result is stored into the parameter block.

As observed by other CPUs and channel programs, references to the parameter block and storage operands may be multiple-access references, accesses to these storage locations are not necessarily block-concurrent, and the sequence of these accesses or references is undefined.

Access exceptions may be reported for a larger portion of the second operand than is processed in a single execution of the instruction; however, access exceptions are not recognized for locations beyond the length of the second operand nor for locations more than 4K bytes beyond the current location being processed.

Symbols Used in Function Descriptions

The symbols of FIG. 6 are used in the subsequent description of the COMPUTE INTERMEDIATE MESSAGE DIGEST and COMPUTE LAST MESSAGE DIGEST functions. Further description of the secure hash algorithm may be found in *Secure Hash Standard*, Federal Information Processing Standards publication 180-1, National Institute of Standards and Technology, Washington D.C., Apr. 17, 1995.

KIMD-Query (KIMD Function Code 0)

The locations of the operands and addresses used by the instruction are as shown in FIG. 5.

Figure 7:
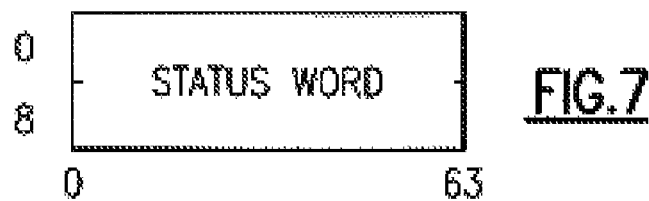
FIG. 7 illustrates the format of the parameter block for KIMD-Query.

The KIMD-Query parameter block has the format shown in FIG. 7.

A 128-bit status word is stored in the parameter block. Bits 0-127 of this field correspond to function codes 0-127, respectively, of the COMPUTE INTERMEDIATE MESSAGE DIGEST instruction. When a bit is one, the corresponding function is installed; otherwise, the function is not installed.

Condition code 0 is set when execution of the KIMD-Query function completes; condition code 3 is not applicable to this function.

KIMD-SHA-1 (KIMD Function Code 1)

The locations of the operands and addresses used by the instruction are as shown in FIG. 5.

Figure 8:
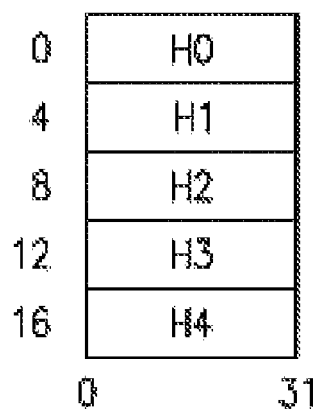
FIG. 8 illustrates the format of the parameter block for KIMD-SHA-1.

The parameter block used for the KIMD-SHA-1 function has the format shown in FIG. 8.

Figure 9:
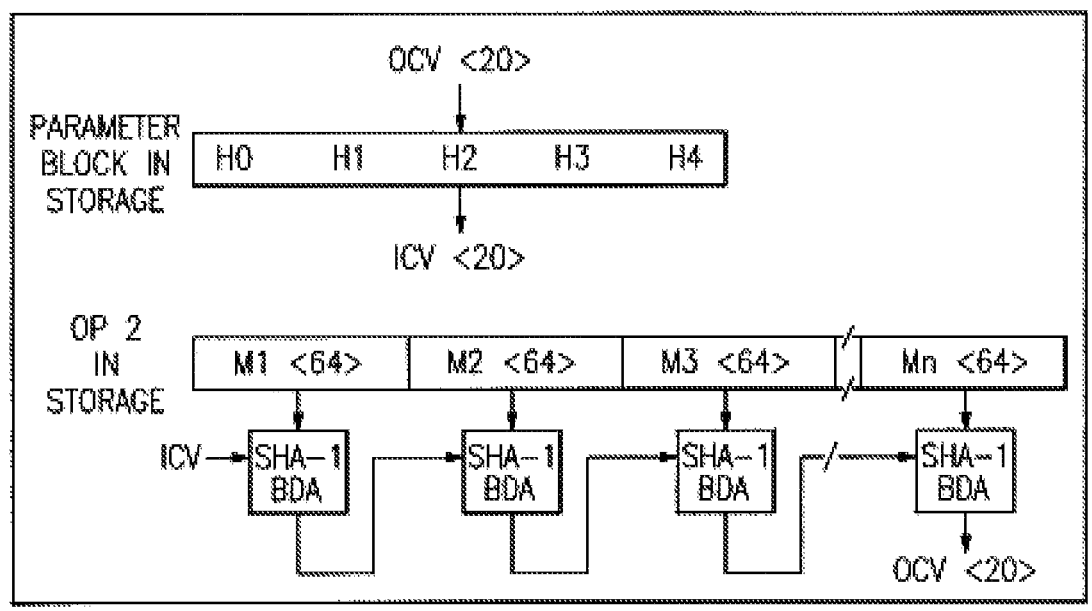
FIG. 9 illustrates the KIMD-SHA-1 operation.

A 20-byte intermediate message digest is generated for the 64-byte message blocks in operand 2 using the SHA-1 block digest algorithm with the 20-byte chaining value in the parameter block. The generated intermediate message digest, also called the output chaining value (OCV), is stored in the chaining-value field of the parameter block. The KIMD-SHA-1 operation is shown in FIG. 9.

KLMD-Query (KLMD Function Code 0)

The locations of the operands and addresses used by the instruction are as shown in FIG. 5.

Figure 10:
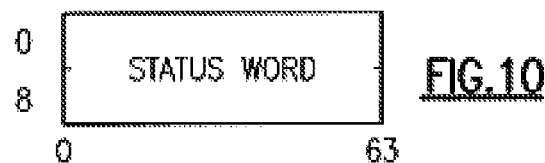
FIG. 10 illustrates the format for the parameter block for KLMD-Query.

The parameter block used for the KLMD-Query function has the format shown in FIG. 10.

A 128-bit status word is stored in the parameter block. Bits 0-127 of this field correspond to function codes 0-127, respectively, of the COMPUTE LAST MESSAGE DIGEST instruction. When a bit is one, the corresponding function is installed; otherwise, the function is not installed.

Condition code 0 is set when execution of the KLMD-Query function completes; condition code 3 is not applicable to this function.

KLMD-SHA-1 (KLMD Function Code 1)

The locations of the operands and addresses used by the instruction are as shown in FIG. 5.

Figure 11:
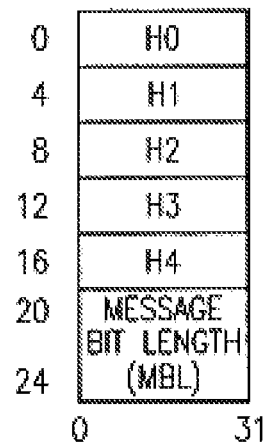
FIG. 11 illustrates the format for the parameter block for KLMD-SHA-1.

The parameter block used for the KLMD-SHA-1 function has the format shown in FIG. 11.

The message digest for the message (M) in operand 2 is generated using the SHA-1 algorithm with the chaining value and message-bit-length information in the parameter block.

Figure 12:
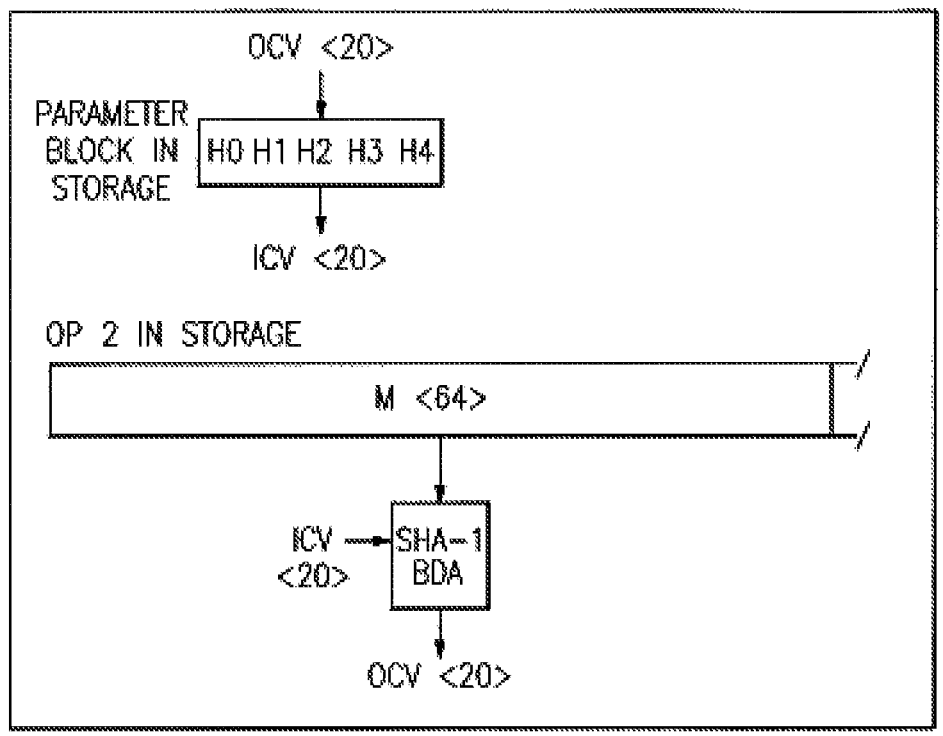
FIG. 12 illustrates KLMD-SHA-1 Full Block operation.
Figure 13:
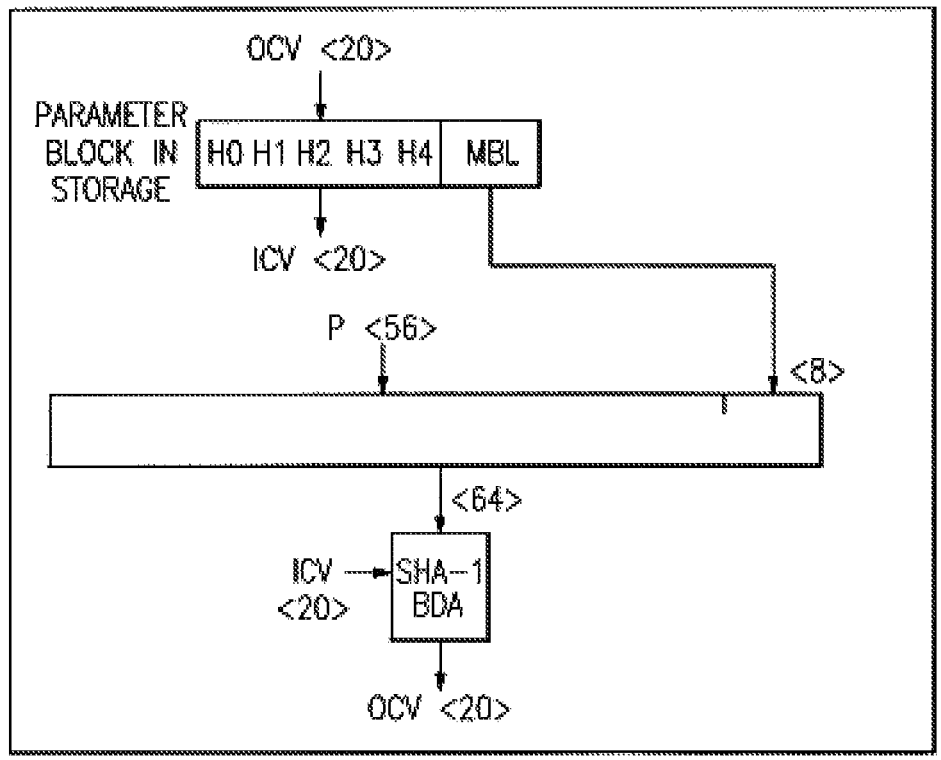
FIG. 13 illustrates the KLMD-SHA-1 Empty Block operation.

If the length of the message in operand 2 is equal to or greater than 64 bytes, an intermediate message digest is generated for each 64-byte message block using the SHA-1 block digest algorithm with the 20-byte chaining value in the parameter block, and the generated intermediate message digest, also called the output chaining value (OCV), is stored into the chaining-value field of the parameter block. This operation is shown in FIG. 12 and repeats until the remaining message is less than 64 bytes. If the length of the message or the remaining message is zero bytes, then the operation in FIG. 13 is performed.

Figure 14:
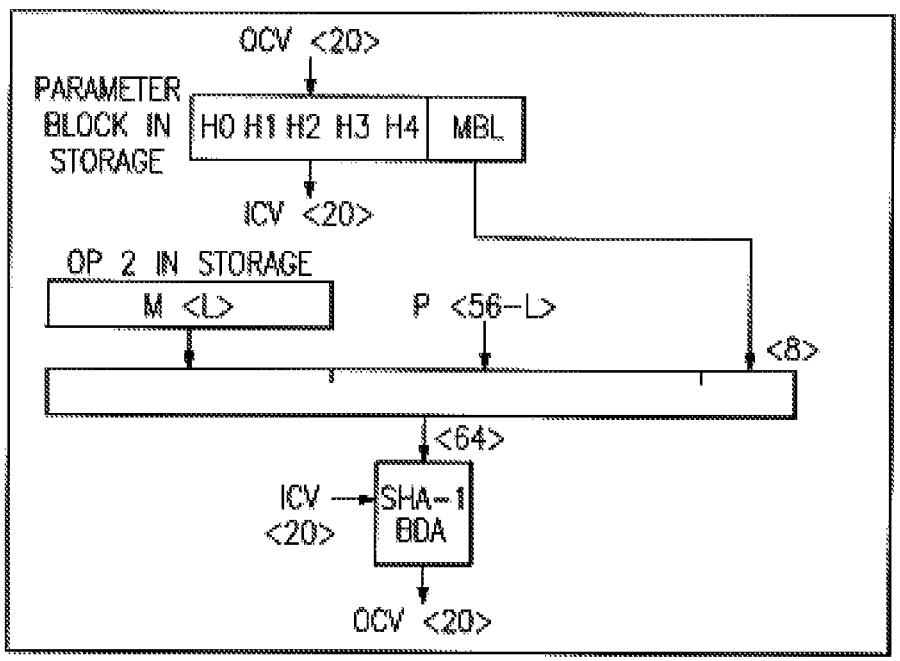
FIG. 14 illustrates the KLMD-SHA-1 Partial-Block Case 1 operation.
Figure 15:
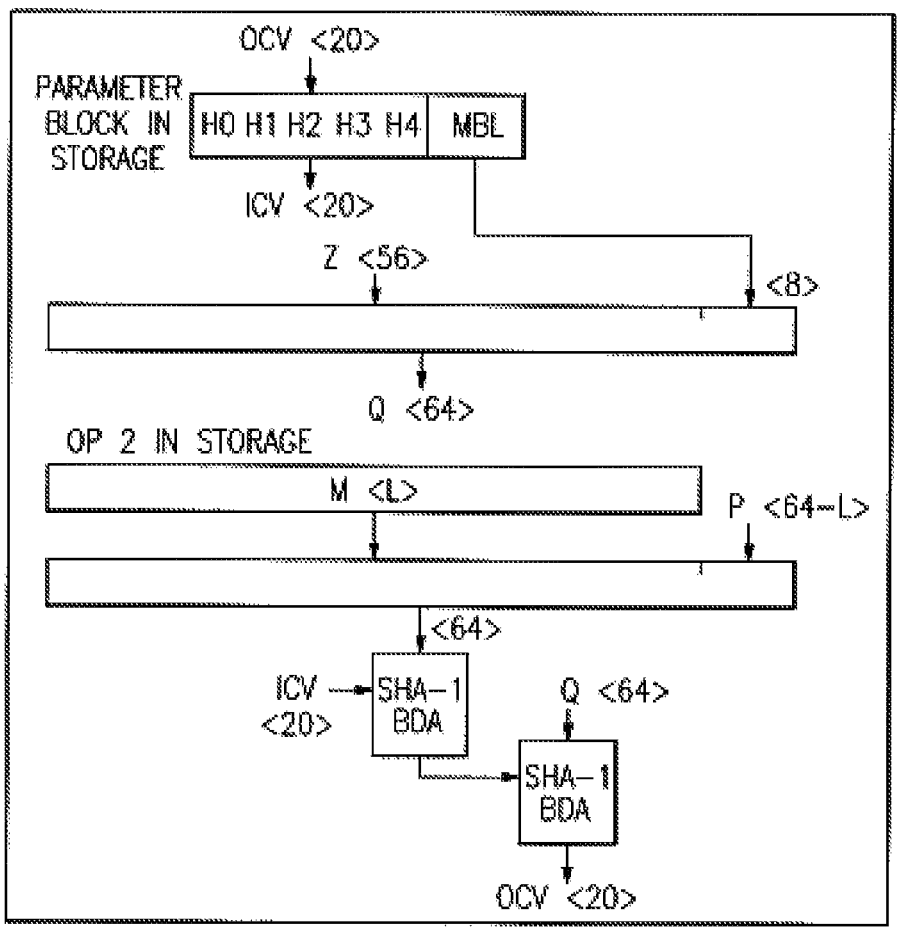
FIG. 15 illustrates the KLMD-SHA-1 Partial-Block Case 2 operation.

If the length of the message or the remaining message is between one byte and 55 bytes inclusive, then the operation in FIG. 14 is performed; if the length is between 56 bytes and 63 bytes inclusive, then the operation in FIG. 15 is performed; The message digest, also called the output chaining value (OCV), is stored in to the chaining-value field of the parameter block.

Additional Symbols Used in KLMD Functions

The following additional symbols are used in the description of the COMPUTE LAST MESSAGE DIGEST functions.

| Symbol | Explanation for KLMD Function Figures |
|---|---|
| L | Byte length of operand 2 in storage. |
| p \<n\> | n padding bytes; leftmost byte is 80 hex; all other bytes are 00 hex. |
| z \<56\> | 56 padding bytes of zero. |
| Mbl | an 8-byte value specifying the bit length of the total message. |
| q \<64\> | a padding block, consisting of 56 bytes of zero followed by an 8-byte mbl. |

Special Conditions for KIMD and KLMD

A specification exception is recognized and no other action is taken if any of the following occurs:
1. Bit 56 of general register 0 is not zero.
2. Bits 57-63 of general register 0 specify an unassigned or uninstalled function code.
3. The R2 field designates an odd-numbered register or general register 0.
4. For COMPUTE INTERMEDIATE MESSAGE DIGEST, the second-operand length is not a multiple of the data block size of the designated function (see FIG. 3 to determine the data block sizes for COMPUTE INTERMEDIATE MESSAGE DIGEST functions). This specification-exception condition does not apply to the query function, nor does it apply to COMPUTE LAST MESSAGE DIGEST.

Resulting Condition Code:

| | |
|---|---|
| 0 | Normal completion |
| 1 | — |
| 2 | — |
| 3 | Partial completion |

Program Exceptions:
Access (fetch, operand 2 and message bit length; fetch and store, chaining value)
Operation (if the message-security assist is not installed)
Specification Programming Notes:
1. Bit 56 of general register 0 is reserved for future extension and should be set to zero.
2. When condition code 3 is set, the second operand address and length in general registers R2 and R2+1, respectively, and the chaining-value in the parameter block are usually updated such that the program can simply branch back to the instruction to continue the operation.

For unusual situations, the CPU protects against endless reoccurrence for the no-progress case. Thus, the program can safely branch back to the instruction whenever condition code 3 is set with no exposure to an endless loop.

3. If the length of the second operand is nonzero initially and condition code 0 is set, the registers are updated in the same manner as for condition code 3; the chaining value in this case is such that additional operands can be processed as if they were part of the same chain.

4. The instructions COMPUTE INTERMEDIATE MESSAGE DIGEST and COMPUTE LAST MESSAGE DIGEST are designed to be used by a security service application programming interface (API). These APIs provide the program with means to compute the digest of messages of almost unlimited size, including those too large to fit in storage all at once. This is accomplished by permitting the program to pass the message to the API in parts. The following programming notes are described in terms of these APIs.

5. Before processing the first part of a message, the program must set the initial values for the chaining-value field. For SHA-1, the initial chaining values are listed as follows:
H0=x'6745 2301'
H1=x'EFCD AB89'
H2=x'98BA DCFE'
H3=x'1032 5476'
H4=x'C3D2 E1F0'

6. When processing message parts other than the last, the program must process message parts in multiples of 512 bits (64 bytes) and use the COMPUTE INTERMEDIATE MESSAGE DIGEST instruction.

7. When processing the last message part, the program must compute the length of the original message in bits and place this 64-bit value in the message-bit-length field of the parameter block, and use the COMPUTE LAST MESSAGE DIGEST instruction.

8. The COMPUTE LAST MESSAGE DIGEST instruction does not require the second operand to be a multiple of the block size. It first processes complete blocks, and may set condition code 3 before processing all blocks. After processing all complete blocks, it then performs the padding operation including the remaining portion of the second operand. This may require one or two iterations of the SHA-1 block digest algorithm.

9. The COMPUTE LAST MESSAGE DIGEST instruction provides the SHA-1 padding for messages that are a multiple of eight bits in length. If SHA-1 is to be applied to a bit string which is not a multiple of eight bits, the program must perform the padding and use the COMPUTE INTERMEDIATE MESSAGE DIGEST instruction.

Crypto Coprocessor:

The preferred embodiment provides a crypto coprocessor which can be used with the instructions described herein and to execute cipher messages and assist in a variety of chaining message tasks which can be employed for chained and cryptographic use with the appropriate instructions.

Figure 17:
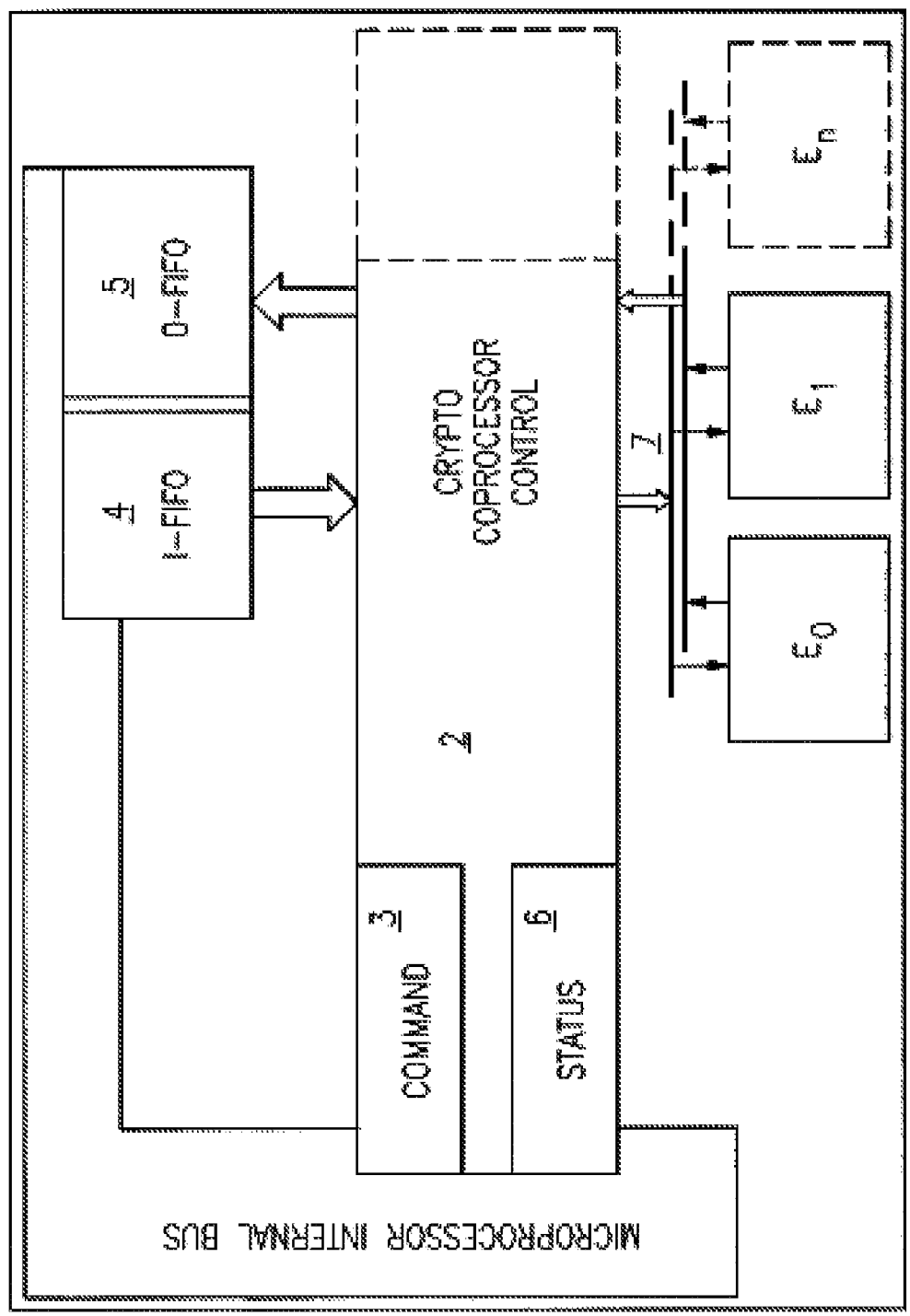
FIG. 17 illustrates our cryptographic coprocessor.

FIG. 17 illustrates our cryptographic coprocessor which is directly attached to a data path common to all internal execution units on the general purpose microprocessor, which has multiple execution pipelines. The microprocessor internal bus (1) is common to all other execution units is attached to the cryptographic control unit (2), and the control unit watches the bus for processor instructions that it should execute.

The cryptographic control unit provides a cryptographic coprocessor directly attached to a data path common to all internal execution units of the central processing unit on a general purpose microprocessor providing the available hardware ($E_0 \ldots E_{n1}$, or from a combination thereof in the preferred embodiment having multiple execution pipelines) for the central processing unit. When a cryptographic instruction is encountered in the command register (3), the control unit (2) invokes the appropriate algorithm from the available hardware. Operand data is delivered over the same internal microprocessor bus via an input FIFO register (4). When an operation is completed the a flag is set in a status register (6) and the results are available to be read out from the output FIFO register (5).

The illustrated preferred embodiment of our invention is designed to be extensible to include as many hardware engines as required by a particular implementation depending on the performance goals of the system. The data paths to the input and output registers (7) are common among all engines.

The preferred embodiment of the invention cryptographic functions are implemented in execution unit hardware on the CPU and this implementation enables a lower latency for calling and executing encryption operations and increases the efficiency.

This decreased latency greatly enhances the capability of general purpose processors in systems that frequently do many encryption operations, particularly when only small amounts of data are involved. This allows implementation that can significantly accelerate the processes involved in doing secure online transactions. The most common methods of securing online transactions involve a set of three algorithms. The first algorithm is only used one time in a session, and may be implemented in hardware or software, while the other operations are invoked with every transaction of the session, and the cost in latency of calling external hardware as well as the cost in time to execute the algorithm in software are both eliminated with this invention.

Figure 18:
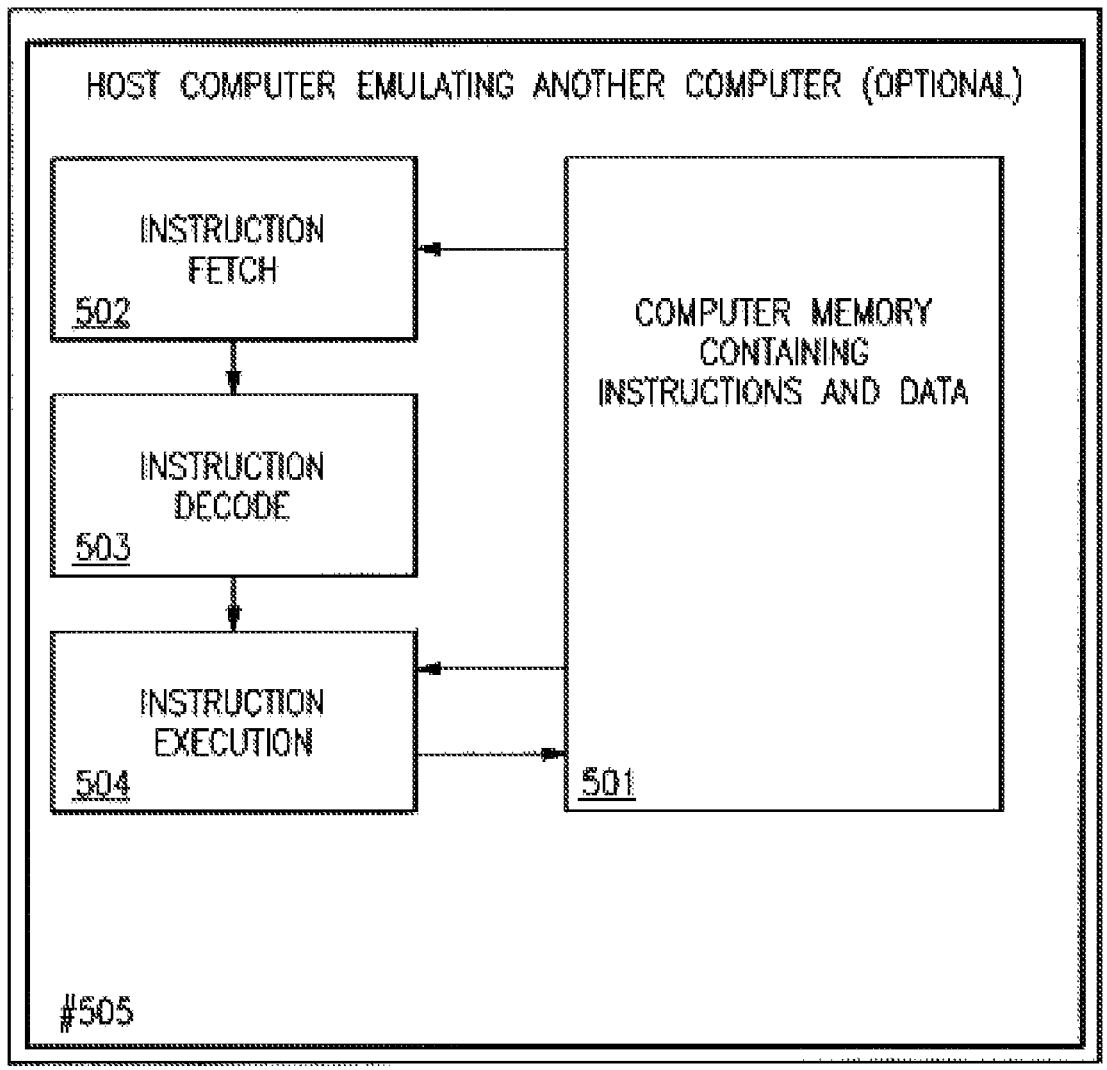
FIG. 18 shows the generalized referred embodiment of a computer memory storage containing instructions in accordance with the preferred embodiment and data, as well as the mechanism for fetching, decoding and executing these instructions, either on a computer system employing these architected instructions or as used in emulation of our architected instructions.

In FIG. 18 we have shown conceptually how to implement what we have in a preferred embodiment implemented in a mainframe computer having the microprocessor described above which can effectively be used, as we have experimentally proven within IBM, in a commercial implementation of the long displacement facility computer architected instruction format the instructions are used by programmers, usually today "C" programmers. These instruction formats stored in the storage medium may be executed natively in a z/Architecture IBM Server, or alternatively in machines executing other architecture. They can be emulated in the existing and in future IBM mainframe servers and on other machines of IBM (e.g. pSeries Servers and xSeries Servers). They can be executed in machines running Linux on a wide variety of machines using hardware manufactured by IBM, Intel, AMD, Sun Microsystems and others. Besides execution on that hardware under a z/Architecture, Linux can be used as well as machines which use emulation by Hercules, UMX, FXI or Platform Solutions, where generally execution is in an emulation mode. In emulation mode the specific instruction being emulated is decoded, and a subroutine built to implement the individual instruction, as in a "C" subroutine or driver, or some other method of providing a driver for the specific hardware as is within the skill of those in the art after understanding the description of the preferred embodiment. Various software and hardware emulation patents including, but not limited to U.S. Pat. No. 5,551,013 for a "Multiprocessor for hardware emulation" of Beausoleil et al., and U.S. Pat. No. 6,009,261: Preprocessing of stored target routines for emulating incompatible instructions on a target processor" of Scalzi et al; and U.S. Pat. No. 5,574,873: Decoding guest instruction to directly access emulation routines that emulate the guest instructions, of Davidian et al; U.S. Pat. No. 6,308, 255: Symmetrical multiprocessing bus and chipset used for coprocessor support allowing non-native code to run in a system, of Gorishek et al; and U.S. Pat. No. 6,463,582: Dynamic optimizing object code translator for architecture emulation and dynamic optimizing object code translation method of Lethin et al; and U.S. Pat. No. 5,790,825: Method for emulating guest instructions on a host computer through dynamic recompilation of host instructions of Eric Traut; and many others, illustrate the a variety of known ways to achieve emulation of an instruction format architected for a different machine for a target machine available to those skilled in the art, as well as those commercial software techniques used by those referenced above.

As illustrated by FIG. 18, these instructions are executed in hardware by a processor or by emulation of said instruction set by software executing on a computer having a different native instruction set.

In FIG. 18, #501 shows a computer memory storage containing instructions and data. The instructions described in this invention would initially stored in this computer. #502 shows a mechanism for fetching instructions from a computer memory and may also contain local buffering of these instructions it has fetched. Then the raw instructions are transferred to an instruction decoder, #503, where it determines what type of instruction has been fetched. #504, shows a mechanism for executing instructions. This may include loading data into a register from memory, #501, storing data back to memory from a register, or performing some type of arithmetic or logical operation. This exact type of operation to be performed has been previously determined by the machine instruction decoder. The instructions described in this invention would be executed here. If the instructions are being executed natively on a computer system, then this diagram is complete as described above. However, if an instruction set architecture is being emulated on another computer, the above process would be implemented in software on a host computer, #505. In this case, the above stated mechanisms would typically be implemented as one or more software subroutines within the emulator software. In both cases an instruction is fetched, decoded and executed.

More particularly, these architected instructions can be used with a computer architecture with existing instruction formats with a 12 bit unsigned displacement used to form the operand storage address and also one having additional instruction formats that provide a additional displacement bits, preferably 20 bits, which comprise an extended signed displacement used to form the operand storage address. These computer architected instructions comprise computer software, stored in a computer storage medium, for producing the code running of the processor utilizing the computer software, and comprising the instruction code for use by a compiler or emulator/interpreter which is stored in a computer storage medium 501, and wherein the first part of the instruction code comprises an operation code which specified the operation to be performed and a second part which designates the operands for that participate. The long displacement instructions permit additional addresses to be directly addressed with the use of the long displacement facility instruction.

Furthermore, the preferred computer architecture has an instruction format such that the opcode is in bit positions 0 through 15.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A computer implemented method for executing a message digest instruction in a processor, the message digest instruction comprising a query function, the method comprising:
determining from a previously defined function code a message digest operation to be executed, the previously defined function code defining any one of a compute message digest operation or a function query operation;
responsive to the determined message digest operation to be executed being a compute message digest operation, performing the compute message digest operation on an operand, the compute message digest operation comprising performing a SHA-1 (Secure Hash Algorithm) hashing algorithm; and
responsive to the determined message digest operation to be executed being a function query operation, saving status word bits in a parameter block, the status word bits corresponding to one or more function codes installed on the processor.

2. The method according to claim 1, wherein the performing the compute message digest operation further comprises:
obtaining a 20 byte chaining value;
x1 obtaining a 64 byte block of the operand;
x2 using the 20 byte chaining value, directly hashing the 64 byte block of the operand to produce a new 20 byte chaining value; and
repeating x1-x2 for successive blocks of the operand; and
storing the new 20 byte chaining value produced for a last block of the operand.

3. The method according to claim 1, wherein responsive to the message digest instruction being a compute last message digest instruction, the method further comprises:
responsive to there being less than 64 bytes to be obtained in the operand, obtaining the less than 64 bytes and padding '00' value bytes to the less than 64 bytes obtained to create a 64 byte operand.

4. The method according to claim 2, wherein the message digest instruction comprises:
an opcode field,
an R2 field, the R2 field specifying a pair of general registers of a plurality of general registers, the pair of general registers comprising a first general register and a second general register, the first general register containing an address of the operand, the second general register specifying a length of the operand, wherein further the previously defined function code is obtained from a first predetermined general register of the plurality of general registers, and
wherein a second predetermined general register of the plurality of general registers contains a storage address of a parameter block, the parameter block comprising the chaining value, the method further comprising:
obtaining the storage address of the parameter block;
initially obtaining a 20 byte chaining value from the parameter block at a location specified by the storage address obtained;
initially obtaining the previously defined function code from the first predetermined general register;
initially obtaining the address of the operand from the first general register;
initially obtaining the length of the operand from the second general register; and
initially obtaining a 64 byte block of the operand at the location specified by the address of the operand obtained.

5. The method according to claim 4, further comprising:
incrementing contents of the first general register according to a number of bytes of the operand processed in the steps performed; and
decrementing contents of the second general register according to the number of bytes of the operand processed in the steps performed.

6. The method according to claim 1, further comprising:
responsive to the compute message digest operation being performed on only a portion of the operand, setting a partial completion condition code value as a condition code, the partial completion condition code value indicating that the compute message digest operation is incomplete; and responsive to the compute message digest operation being performed on all of the operand, setting a normal completion condition code value as a condition code, the normal completion condition code value indicating that the compute message digest operation is complete.

7. A computer program product for executing a message digest instruction in a processor, the message digest instruction comprising a query function, the computer program product comprising:
a storage medium readable by a processing circuit and storing instructions for execution by the processing circuit for performing a method comprising:
determining from a previously defined function code a message digest operation to be executed, the previously defined function code defining any one of a compute message digest operation or a function query operation;
responsive to the determined message digest operation to be executed being a compute message digest operation, performing the compute message digest operation on an operand, the compute message digest operation comprising performing a SHA-1 (Secure Hash Algorithm) hashing algorithm; and
responsive to the determined message digest operation to be executed being a function query operation, saving status word bits in a parameter block, the status word bits corresponding to one or more function codes installed on the processor.

8. The computer program product according to claim 7, wherein the performing the compute message digest operation further comprises:
obtaining a 20 byte chaining value;
obtaining a 20 byte chaining value;
x1 obtaining a 64 byte block of the operand;
x2 using the 20 byte chaining value, directly hashing the 64 byte block of the operand to produce a new 20 byte chaining value; and
repeating x1-x2 for successive blocks of the operand; and
storing the new 20 byte chaining value produced for a last block of the operand.

9. The computer program product according to claim 7, wherein responsive to the message digest instruction being a compute last message digest instruction, the method further comprises:
responsive to there being less than 64 bytes to be obtained in the operand, obtaining the less than 64 bytes and padding '00' value bytes to the less than 64 bytes obtained to create a 64 byte operand.

10. The computer program product according to claim 8, wherein the message digest instruction comprises:
an opcode field,
an R2 field, the R2 field specifying a pair of general registers of a plurality of general registers, the pair of general registers comprising a first general register and a second general register, the first general register containing an address of the operand, the second general register specifying a length of the operand, wherein further the previously defined function code is obtained from a first predetermined general register of the plurality of general registers, and
wherein a second predetermined general register of the plurality of general registers contains a storage address of a parameter block, the parameter block comprising the chaining value, the method further comprising:
obtaining the storage address of the parameter block;
initially obtaining a 20 byte chaining value from the parameter block at a location specified by the storage address obtained;
initially obtaining the previously defined function code from the first predetermined general register;
initially obtaining the address of the operand from the first general register;
initially obtaining the length of the operand from the second general register; and
initially obtaining a 64 byte block of the operand at the location specified by the address of the operand obtained.

11. The computer program product according to claim 8, wherein the method further comprises:
incrementing contents of the first general register according to a number of bytes of the operand processed in the steps performed; and
decrementing contents of the second general register according to the number of bytes of the operand processed in the steps performed.

12. The computer program product according to claim 7, wherein the method further comprises:
responsive to the compute message digest operation being performed on only a portion of the operand, setting a partial completion condition code value as a condition code, the partial completion condition code value indicating that the compute message digest operation is incomplete; and
responsive to the compute message digest operation being performed on all of the operand, setting a normal completion condition code value as a condition code, the normal completion condition code value indicating that the compute message digest operation is complete.

13. The computer program product according to claim 7, wherein responsive to the message digest instruction not being native to the machine instruction architecture of a processor, wherein the method further comprises:
interpreting the message digest instruction to identify a predetermined software routine for emulating the operation of the message digest instruction, the predetermined software routine comprising a plurality of instructions; and
executing the predetermined software routine.

14. A system for executing a message digest instruction in a processor, the message digest instruction comprising a query function, the system comprising:
a memory;
a computer system in communication with the memory, wherein the computer system is capable of executing a method comprising:
determining from a previously defined function code a message digest operation to be executed, the previously defined function code defining any one of a compute message digest operation or a function query operation;
responsive to the determined message digest operation to be executed being a compute message digest operation, performing the compute message digest operation on an operand, the compute message digest operation comprising performing a SHA-1 (Secure Hash Algorithm) hashing algorithm; and responsive to the determined message digest operation to be executed being a function query operation, saving status word bits in a parameter block, the status word bits corresponding to one or more function codes installed on the processor.

15. The system according to claim 14, wherein the performing the compute message digest operation further comprises:
   obtaining a 20 byte chaining value;
   obtaining a 20 byte chaining value;
   x1 obtaining a 64 byte block of the operand;
   x2 using the 20 byte chaining value, directly hashing the 64 byte block of the operand to produce a new 20 byte chaining value; and
   repeating x1-x2 for successive blocks of the operand; and
   storing the new 20 byte chaining value produced for a last block of the operand.

16. The system according to claim 14, wherein responsive to the message digest instruction being a compute last message digest instruction, the method further comprises:
   responsive to there being less than 64 bytes to be obtained in the operand, obtaining the less than 64 bytes and
   padding '00' value bytes to the less than 64 bytes obtained to create a 64 byte operand.

17. The system according to claim 15, wherein the message digest instruction comprises:
   an opcode field,
   an R2 field, the R2 field specifying a pair of general registers of a plurality of general registers, the pair of general registers comprising a first general register and a second general register, the first general register containing an address of the operand, the second general register specifying a length of the operand, wherein further the previously defined function code is obtained from a first predetermined general register of the plurality of general registers, and
   wherein a second predetermined general register of the plurality of general registers contains a storage address of a parameter block, the parameter block comprising the chaining value, the method further comprising:
   obtaining the storage address of the parameter block;
   initially obtaining a 20 byte chaining value from the parameter block at a location specified by the storage address obtained;
   initially obtaining the previously defined function code from the first predetermined general register;
   initially obtaining the address of the operand from the first general register;
   initially obtaining the length of the operand from the second general register; and
   initially obtaining a 64 byte block of the operand at the location specified by the address of the operand obtained.

18. The system according to claim 17, wherein the method further comprises:
   incrementing contents of the first general register according to a number of bytes of the operand processed in the steps performed; and
   decrementing contents of the second general register according to the number of bytes of the operand processed in the steps performed.

19. The system according to claim 14, wherein the method further comprises:
   responsive to the compute message digest operation being performed on only a portion of the operand, setting a partial completion condition code value as a condition code, the partial completion condition code value indicating that the compute message digest operation is incomplete; and
   responsive to the compute message digest operation being performed on all of the operand, setting a normal completion condition code value as a condition code, the normal completion condition code value indicating that the compute message digest operation is complete.

20. The system according to claim 14, wherein responsive to the message digest instruction not being native to the machine instruction architecture of the processor, wherein the method further comprises:
   interpreting the message digest instruction to identify a predetermined software routine for emulating the operation of the message digest instruction, the predetermined software routine comprising a plurality of instructions; and
   executing the predetermined software routine.

* * * * *